April 17, 1951        G. A. TINNERMAN        2,549,724
FASTENING DEVICE
Filed May 25, 1948
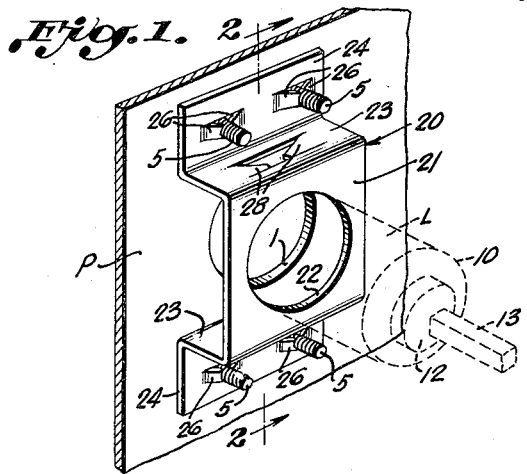
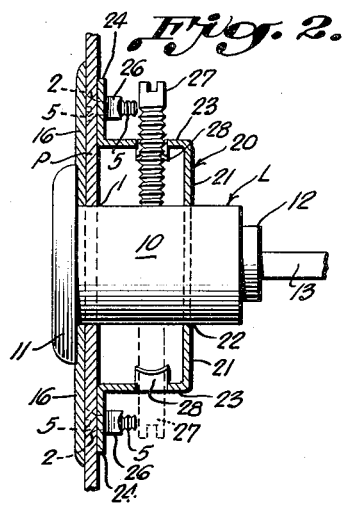
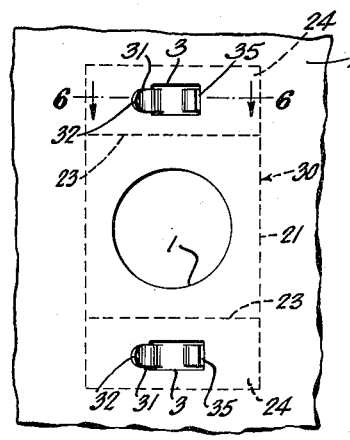
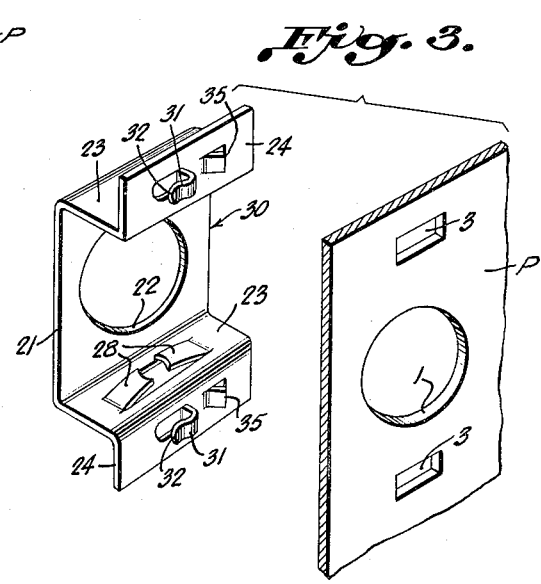
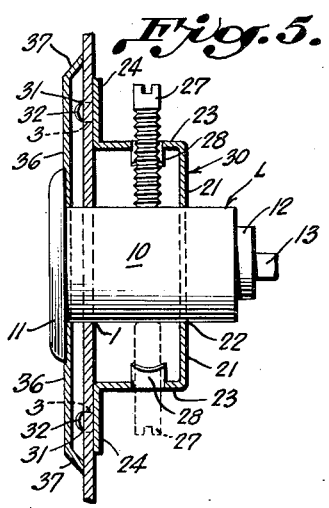
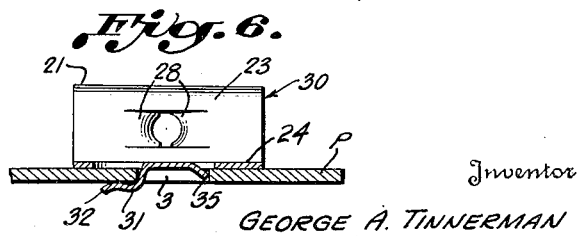
Inventor
GEORGE A. TINNERMAN
By H. G. Lombard
ATTORNEY Patented Apr. 17, 1951

2,549,724

UNITED STATES PATENT OFFICE 2,549,724

FASTENING DEVICE

George A. Tinnerman, Cleveland, Ohio, assignor to Tinnerman Products, Inc., Cleveland, Ohio, a corporation of Ohio Application May 25, 1948, Serial No. 29,161

3 Claims. (Cl. 70—370)

This invention relates in general to door lock installations and the like, and deals, more particularly, with improvements in the mounting of a door cylinder lock of the type widely used for locking the doors of automotive vehicles and various cabinet structures of general utility, for example. The present application is a continuation in part of applicant's prior copending application Serial Number 738,266, filed March 31, 1947, and since issued as Patent Number 2,443,362, dated June 15, 1948.

The invention has for a primary object the provision of an improved mounting for a door cylinder lock, or similar object utilizing a light weight, inexpensive sheet metal device which is formed in a reinforced, strong and durable, plate-like retainer adapted to receive the barrel or body of the cylinder lock and to secure the same firmly and rigidly in any required position of adjustment in a completed mounting.

A further object of the invention is to provide such a mounting for a door cylinder lock, or the like, in which the sheet metal retainer embodies mounting means for the cylinder lock combined with means for attaching the retainer to the door frame supporting panel or other supporting part.

Another object is to provide an improved mounting of the kind described in which the securing means of the retainer comprises a set screw device threadedly engaged with integral thread means provided in the retainer in such a way as to permit the set screw to be easily and quickly actuated for completing an installation in a minimum of time and effort.

A more specific object of the invention is to provide the improved mounting of the invention with a retainer embodying all the foregoing features of construction and which comprises a one-piece sheet metal device that is strong and durable, and is manufactured at relatively low cost from standard sheet metal strip stock with a minimum loss or waste of material.

An additional object of the invention is to provide the described mounting for a door cylinder lock, or similar body, in which the retainer is designed to be attached to a supporting part together with an escutcheon which conceals the means for attaching the retainer and otherwise enhances the appearance of the completed mounting.

Further objects and advantages of the invention and other new and useful features in the construction, arrangement and combination of parts thereof will be readily apparent as the following description proceeds with reference to the accompanying drawings, for purposes of illustration but not of limitation, in which like reference characters designate like parts throughout, and in which:

Fig. 1 is a perspective view of the rearward side of the mounting area of a door panel or other support showing the attachment of the retainer to the door panel in position for mounting the door cylinder lock, represented in dotted lines; and, Fig. 2 is a sectional view of Fig. 1 along line 2—2, looking in the direction of the arrows, showing a completed mounting in accordance with the invention.

Fig. 3 is a perspective view of the forward side of a door panel or other support showing the same as prepared for the attachment of another form of retainer in accordance with the invention;

Fig. 4 is a front elevational view of the forward side of the door panel represented in Fig. 3 showing the retainer in attached position thereon;

Fig. 5 is a vertical sectional view of a completed mounting embodying the retainer of Figs. 3 and 4; and, Fig. 6 is a sectional view of Fig. 5 along line 6—6 showing the integral clip means provided on the retainer for attachment to the door panel, or the like.

Referring now, more particularly, to the drawings, Fig. 1 and 2 illustrate one form of the invention in a typical installation for mounting a door cylinder lock, or the like, in operative position on a door panel P, or other support. The door panel P or other supporting part may be of any suitable metal, wood, plastic or fibre board construction but usually is in the form of a sheet metal panel, as shown, which is provided with an opening 1 for receiving the barrel or body 10 of the door cylinder lock L, or the like, in the area in which the lock is to be installed. The door cylinder lock is of a conventional type which comprises a barrel or body 10 having an outer annular peripheral flange 11 and a key passage in an inner plug or cylinder 12 connected to a spindle 13 controlling the door latching or bolting mechanism.

In addition to the opening 1 for receiving the body of the cylinder lock L, the panel P is provided with suitable attaching holes 2, slots, or the like, for attaching the retaining means which secures the lock unit L onto the door panel. In the present example, such attaching holes 2 comprise a pair of spaced passages on each side of the opening 1 for receiving bolts or screws 5 that secure the retainer which mounts the said door cylinder lock in the completed installation. In other forms of the invention, the panel is provided with similar openings for receiving rivets, welding or any other type of attaching means for completing the desired mounting. As seen in Fig. 2, the heads of the attaching bolts or screws 5 are exposed and visible on the outer side of the panel P and, in order to conceal the same and present a neat and artistic appearance, there is provided an escutcheon 16, or the like, having an opening which permits the same to fit over the barrel 10 of the lock beneath the peripheral flange 11 and thereby overlie and conceal such fasteners 5 in the completed mounting.

At the rearward side of said panel P, a retainer 20 having a central opening corresponding to the opening 1 in said panel P is secured to the rearward side of panel P with said openings in aligned relation. The retainer 20 is a simple generally U-shaped member which preferably is formed in one-piece from a single section of standard sheet metal strip material, preferably spring metal or cold rolled metal having spring characteristics. The middle portion of the strip defines the outer wall or base 21 of the retainer and is provided with a central opening 22 corresponding substantially to the opening 1 in the panel member P. The retainer is bent inwardly at opposite sides of said base portion 21 to provide spaced side walls 23 and outwardly extending flanges 24 on the ends thereof which are secured to the panel P or other support in a manner whereby said base 21 of the retainer is spaced from the adjacent rearward surface of said panel P. Any suitable securing means may be employed for this purpose and, in the form of invention shown in Figs. 1 and 2, said end flanges 24 are secured by the bolts or screws 5 threadedly engaged with integral thread engaging means in the form of cooperating tongues 26 struck and formed from the material of said flanges 24.

The retainer may be secured to the panel in an equivalent manner by rivets or welding or by nails, staples, or wood screws in instances where the supporting panel P is of wood, plastic or fibre board construction. In any case, the retainer 20 is secured to the panel P with the base portion 21 spaced therefrom and with the opening 22 therein aligned with the opening 1 in the panel in order to receive and support the lock unit L as shown in Fig. 2, and as illustrated by the dotted lines in Fig. 5.

The side walls 23 of the retainer are provided with bolt or screw thread engaging means for threadedly engaging a set screw 27 applied to either of said sidewalls 23, for exerting a clamping action on the barrel 10 of the cylinder lock L to maintain the same in mounted position substantially as shown in Fig. 2. Such thread engaging means may be provided in any suitable manner, but preferably are in the form of integral cooperating tongues 28 which are struck from the sheet metal material of the side walls 23 and so formed that the extremities thereof lie on a helix corresponding substantially to that of the thread of the set screw 27 for uniform threaded engagement therewith. Such thread engaging means 27 and the similar thread engaging means 16 in the end flanges 24, as aforesaid, are of the same general character comprising a pair of tongues or the like which are integrally formed in the sheet metal blank from which the retainer 20 is provided. In this regard, the retainer construction of the invention is particularly advantageous in that all such thread engaging means may be stamped simultaneously to provide the retainer as a simple one-piece article of manufacture which may be produced at relatively low cost in a minimum of manufacturing operations.

The thread engaging elements 28 are best provided from the sheet metal material of the side walls 23 by an aperture intermediate spaced parallel slits which form the cooperating tongues, or the like, having spaced extremities defining the desired thread or thread opening corresponding substantially to the roof of the set screw 27 for threadedly engaging the thread thereof. Said tongues 28 otherwise are preferably formed to project inwardly out of the plane of the wall 23 and are bent lengthwise in substantial ogee formation to provide the maximum possible strength to withstand the tightening action of the set screw 27 as it is advanced to its final clamping position.

Such thread engaging means may be pressed, stamped, extruded, or otherwise provided in any suitable form or construction so long as the same threadedly engage with thread of the associated bolt or screw and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, resilient tongues, as shown, are highly efficient and practical in that they are possessed of unusual inherent strength and will not collapse or pull through when the set screw is tightened, nor loosen under continuous strain and vibration in the installation. This takes place by reason of the fact that the sheet metal material from which such tongues are formed is of less thickness than the pitch or spacing between adjacent thread convolutions of the set screw, wherefore the extremities of said tongues tend, more effectively, to move toward each other and bite into the grooves intermediate adjacent thread convolutions when the screw is tightened, and otherwise become embedded in the root of the screw in locked, frictional fastening engagement therewith in applied fastening position. There is thereby eliminated the necessity for a separate, auxiliary locking means such as a lock nut or lock washer and this, in mass production, makes possible a considerable saving not only in the cost of such locking devices, but also, in the expense and labor involved in the tedious, time consuming assembling operations and other added steps in manufacture which such auxiliary locking means require. It is to be understood, however, that the present invention is not limited in any manner or form to the illustrated construction of the thread engaging means 26 and 28, but rather, comprehends also, various other similar and related forms of such tongues or equivalent thread engaging elements.

The retainer provided in the manner described is attached over the opening 1 in the door panel or other support by the bolts or screws 5, threadedly engaged with the integral thread means 26 provided in the end flanges 24 of the retainer. The opening 1 in the panel P and the aligned opening 22 in the base 21 of the adapter which is spaced from said panel present spaced bearing surfaces which are adapted to receive snugly the body or barrel 10 of the cylinder lock as shown in Fig. 2 and to support the same firmly and rigidly at spaced points. In the final assembly, the escutcheon plate 16 is slipped over the body or barrel 10 of the cylinder lock to a position adjacent the peripheral flange 11, whereupon the said barrel or body 10 is passed through the spaced, aligned openings 1 and 22 in the panel and retainer, respectively, and with the peripheral flange 11 bearing on the escutcheon plate 16 which in turn seats upon the outer surfaces of the door panel and overlies and conceals the heads of the attaching bolts or screws 5.

The set screw 27 may then be applied to the thread engaging elements 28 in either of the side walls 23, depending on which position the set screw is most easily accessible in the complete installation. In mass production methods of assembly, this, of course, is predetermined, and accordingly, the set screw 27 is preferably assembled with the retainer prior to attachment of the retainer to the door panel, as aforesaid, with the set screw 27 in either position represented by the full or dotted lines in Fig. 2. In any case, the set screw 27 is threaded with the thread elements 28 and is rotated into tightened clamping engagement with the body or barrel 10 of the cylinder lock. In such clamping relation of the set screw 27, the thread locking action provided by the thread engaging tongues 28, as aforesaid, positively locks the set screw in tightened clamping position against accidental or unintended loosening under the most severe conditions of vibratory motion or shock.

Figs. 3 to 6 inclusive disclose another form of the invention in which the retainer is provided with integral clip type attaching means by which the completed mounting for the retainer is effected without the use of bolts, screws or other auxiliary attaching means. In this form of the invention, the door panel or other support is provided with a similar opening 1 for receiving the body or barrel 10 of the lock together with attaching openings such as slots 3 on either side of said opening 1. The retainer 30 is generally similar in construction, application and use to that described with references to Figs. 1 and 2 except that the end flanges 24 of the retainer are provided with integral hooks 31 stamped therefrom in a size and spacing corresponding substantially to that of said attaching openings 3 in the door panel.

The hooks 31 are so designed as to be received in the attaching slots 3 in the initial step of attaching the retainer to the door panel, and thereafter to be moved laterally to clasp portions of the door panel adjacent said slots 3 as illustrated in Figs. 4 and 6. This takes place when the retainer is moved laterally to its fully attached position in which the opening 22 therein is aligned with the opening 1 in the door panel. To this end, said hooks 31 are provided on the end flanges 24 of the retainer in offset relation to the opening 22 therein so that said opening 22 will be in registration with the opening 1 of the door panel upon lateral movement of the retainer and the hooks 31 thereon to fully attached position, as aforesaid. Preferably said hooks 31 are so designed as to define a shoulder adjoining the end flange and an outwardly flared lip 32 on the extremity thereof which facilitates the initial application of said hooks into the assembling slots 3 and otherwise expedites the clasping engagement of said hooks with the marginal edge portions of the door panel adjacent said assembling slots as shown in Fig. 6. In order to lock the hooks 31 in such attached position in the assembling slots 3, there is provided with each hook a cooperating locking detent 35 which is adapted to snap into said assembling slots 3 and engage the opposing edge portions of said slots as seen in Fig. 6. This locks the hooks 31 in applied clasping position and prevents any lateral movement or shifting of the retainer in the direction toward disconnection or displacement from attached position on the door panel.

With the retainer 30 thus provided with the attaching hooks 31 and cooperating detents 35, and the door panel prepared with the spaced assembling slots 3, the retainer is easily and quickly applied to positively locked attached position on the door panel simply by inserting the free ends of said hooks 31 into and through said assembling slots 3 and sliding the retainer in the direction of the free ends of said hooks 31. The outwardly flared lips 32 on the extremities of said hooks facilitate this initial step in applying the hooks by causing a gradual outward flexing thereof over the edge of the assembling slots 3. Upon sliding the retainer in the direction of the free ends of the hooks, said hooks clear the underside of the door panel and permit the retainer to be advanced to its fully attached position to the point at which the shoulders defined by the hooks abut the adjacent edges of the assembling slots 3 substantially as shown in Fig. 6. In this position, the locking detents 35 are also received in said assembling slots 3 in engagement with the opposite edges thereof inasmuch as they are provided for this purpose with a predetermined spacing from the shoulders defined by the hooks and thereby cooperate therewith in the assembling slots 3 to lock the hooks in fully attached fastening position on the door panel. Accordingly, in fully attached position, the hooks 31 are in rigid gripping engagement with the marginal portions of the door panel adjacent the assembling slots 3, while the locking detents 35 cooperate in engagement with the opposing edges of the assembling slots 3 to lock the retainer in such attached position and thereby prevent displacement or disconnection of the retainer from the door panel.

With the retainer thus attached to the door panel, the lock L is secured in operative position in the completed mounting shown in Fig. 5, substantially as described with reference to Figs. 1 and 2. The escutcheon 36 is applied over the body or barrel 10 of the lock to a position adjacent the peripheral flange 11. The barrel 10 is then passed through the spaced aligned openings 1 and 22 in the panel P and retainer, respectively, and positioned therein with said peripheral flange 11 seating on the escutcheon 36 which in turn bears upon the outer surface of the door panel and overlies and conceals the attaching holes 3, the attaching hooks 31 and cooperating locking detents 35. The escutcheon 36 in this form of the invention is provided in a generally concave design with a dependent peripheral skirt 37 which supports the escutcheon against the door panel with suitable clearance from the projecting free ends 32 of the hooks in attached position as shown in Fig. 5. The set screw 27 which is applied to the thread engaging elements 28 in either of the side walls 23 is then actuated to clamp the body or barrel 10 of the lock in the completed mounting as and for the purposes described with reference to the form of the invention shown in Figs. 1 and 2.

Although the invention is described in connection with a mounting for a cylinder lock, it is to be understood that the improved construction in general is equally applicable to other similar applications and uses in the mounting of door handles, and various structural members embodying sleeves, bushings and like bodies within the broad general scope and basic teachings of the instant disclosure.

The retainer preferably is constructed of relatively thin sheet metal, the thickness of which is selected according to service requirements and the predetermined size of the barrel of the cylinder lock, or the sleeve, bushing or similar body of any other part to be mounted in accordance with the invention. The retainers are most effective when provided of spring metal suitably tempered and treated to give the desired toughness and hardness, particularly in the area of the integral thread engaging tongues 28 which must be capable of withstanding the pronounced tightening force of the set screw in clamping engagement with the barrel of the cylinder lock, as shown in Figs. 2 and 5. A cheap but effective retainer may be provided from cold rolled metal such as cold rolled steel, which is untempered but of a spring metal nature and capable of providing an effective and reliable installation adapted for a long period of satisfactory service and use.

What is claimed is:

1. A mounting for an article, comprising, a support having an opening, a retainer secured to the support, said retainer having a base provided with an opening aligned with the opening in said support and side walls support and side walls supporting said base in spaced relation to said support, one of said side walls having a thread opening, and a bolt or screw threaded in said thread opening for exerting a clamping action on an article mounted in the openings of said support and retainer.

2. A mounting for a lock, comprising, a support having an opening, a retainer secured to said support comprising a sheet metal body bent to provide a base having an opening aligned with the opening in the support and side walls supporting said base in spaced relation to said support, one of said side walls having an aperture, tongues on said one side wall extending into said aperture, and a bolt or screw extending through said aperture and engaged by said tongues for exerting a clamping action on a lock mounted in said openings of said support and retainer.

3. A retainer comprising a one-piece sheet metal body bent to provide a base and side walls projecting from said base, flanges extending from said side walls, means on said flanges for attaching the same to a support, one of said side walls having an opening, tongues on said one side wall extending into said opening, and a screw or bolt extending through said opening and engaged by said tongues.

GEORGE A. TINNERMAN.

REFERENCES CITED

The following references are of record in the file of this patent:

UNITED STATES PATENTS

| Number | Name | Date |
| --- | --- | --- |
| 671,147 | Robbins et al. | Apr. 2, 1901 |
| 1,462,826 | Rixson | July 24, 1923 |
| 1,814,938 | Lindquist et al. | July 14, 1931 |
| 2,128,040 | Conners | Aug. 23, 1938 |
| 2,307,106 | Brush | Jan. 5, 1943 |
| 2,329,158 | Gill | Sept. 7, 1943 |
| 2,391,884 | DeOrlow | Jan. 1, 1946 |